«12» United States Patent
Liu et al.

«10» Patent No.: US 12,516,652 B2
«45» Date of Patent: Jan. 6, 2026

«54» ENERGY HARVESTING DEVICE BASED ON WAVE ENERGY

«71» Applicant: Guangzhou University, Guangzhou (CN)

«72» Inventors: Airong Liu, Guangzhou (CN); Kejie Dong, Guangzhou (CN); Zhicheng Yang, Guangzhou (CN); Jiyang Fu, Guangzhou (CN); Wengao Xie, Guangzhou (CN); Fan Zhang, Guangzhou (CN); Yixiao Zhang, Guangzhou (CN)

«73» Assignee: GUANGZHOU UNIVERSITY, Guangzhou (CN)

«*» Notice: Subject to any disclaimer, the term of this patent is extended or adjusted under 35 U.S.C. 154(b) by 822 days.

«21» Appl. No.: 17/818,287

«22» Filed: Aug. 8, 2022

«65» Prior Publication Data
US 2023/0124108 A1    Apr. 20, 2023

«30» Foreign Application Priority Data
Sep. 24, 2021   (CN) ........................ 202111125827.1

«51» Int. Cl.
F03B 13/16    (2006.01)
H02N 2/18     (2006.01)

«52» U.S. Cl.
CPC ............. F03B 13/16 (2013.01); H02N 2/186 (2013.01)

«58» Field of Classification Search
CPC .... F03B 13/16; F03B 13/14; F05B 2220/709; F05B 2260/503; H02N 2/186; Y02E 10/30
See application file for complete search history.

«56» References Cited

U.S. PATENT DOCUMENTS 9,309,860 B2 *    4/2016   Hon ........................ F03B 13/16
2015/0285212 A1 *  10/2015  Wu ........................ H10N 30/306
                                                        310/339

* cited by examiner

Primary Examiner — Emily P Pham
«74» Attorney, Agent, or Firm — Getech Law LLC; Jun Ye

«57» ABSTRACT

An energy harvesting device based on wave energy comprises: a box body; a swing rod hinged with the box body, wherein one end of the swing rod extends into the box body, and a float is fixed at the other end of the swing rod; a base layer disposed inside the box body and provided with a plurality of piezoelectric patches in a length direction; and an energy transmission assembly fixed inside the box body and located between the swing rod and the base layer, one side of the energy transmission assembly is connected with one end of the swing rod extending into the box body, and the other side of the energy transmission assembly is in transmission connection with the base layer, wherein the energy transmission assembly converts the swinging of the swing rod into squeezing to the base layer.

10 Claims, 5 Drawing Sheets

ENERGY HARVESTING DEVICE BASED ON WAVE ENERGY

TECHNICAL FIELD

The present invention relates to the technical field of ocean wave energy utilization engineering, in particular to an energy harvesting device based on wave energy.

BACKGROUND

With the increasing demand for energy in the world and the increasingly prominent environmental problems, ocean wave energy has attracted much attention as a clean and renewable energy. Wave energy is a simple mechanical energy with high energy density, high sustainability and wide distribution, and it is the best and most common energy in the ocean. In addition, a cantilever beam piezoelectric energy harvester has too low working bandwidth and a small frequency range of energy harvesting, and cannot effectively use the wave energy in the ocean.

SUMMARY

The present invention aims at solving one of the above-described technical problems in the prior art at least to some extent. Therefore, an embodiment of the present invention provides an energy harvesting device based on wave energy, which can maximize the utilization of the wave energy in the ocean and convert it into usable electric energy.

The energy harvesting device based on wave energy according to the embodiment of the present invention comprises: a box body; a swing rod hinged with the box body, wherein one end of the swing rod extends into the box body, and a float is disposed at the other end of the swing rod; a base layer arranged inside the box body and provided with a plurality of piezoelectric patches in a length direction; and an energy transmission assembly fixed inside the box body and located between the swing rod and the base layer, one side of the energy transmission assembly is connected with one end of the swing rod extending into the box body, the other side of the energy transmission assembly is in transmission connection with the base layer, wherein the energy transmission assembly converts the swinging of the swing rod into squeezing to the base layer, so that the base layer is elastically deformed, and thus the piezoelectric patches are driven to generate a piezoelectric effect to output voltage.

As a further improvement of the above-described solution, the energy transmission assembly comprises a first connecting rod, a second connecting rod, a first gear and a second gear, the first gear is rotatably connected with the box body, the second gear is rotatably connected with the box body and is in transmission connection with the first gear, one end of the first connecting rod is hinged with the swing rod, the other end of the first connecting rod is hinged with the first gear, one end of the second connecting rod is hinged with the second gear, and the other end of the second connecting rod is hinged with the base layer.

As a further improvement of the above-described solution, the first gear is in transmission connection with the second gear through a third gear, and the number of teeth of the second gear and the number of teeth of the third gear are both less than the number of teeth of the first gear.

As a further improvement of the above-described solution, the first gear is an internal gear, the second gear and the third gear are both external gears, the second gear is located in the center of the first gear, wherein the first gear and the second gear are both meshed with the third gear, thereby forming a planetary gear mechanism.

As a further improvement of the above-described solution, the gear ratio of the first gear, the second gear and the third gear is one of 2:1:1, 3:1:1 and 4:1:2.

As a further improvement of the above-described solution, the middle of the base layer bulges to form an arc-shaped structure, the piezoelectric patches are distributed inside and outside the arc-shaped structure, and several piezoelectric patches are sequentially connected in series.

As a further improvement of the above-described solution, the energy harvesting device based on wave energy also comprises an energy conversion assembly and a spring assembly that are arranged inside the box body, the energy conversion assembly comprises a magnetostrictiverod in a magnetized state and a closing coil, the closing coil is sleeved on the magnetostrictiverod, the spring assembly is fixed at an end of the magnetostrictiverod, and mechanical energy of the swing rod is converted into pressure on the magnetostrictiverod through the spring assembly.

As a further improvement of the above-described solution, the spring assembly comprises a fixed disk, a guide, a spring and a sliding block, the guide is fixed at an end of the magnetostrictiverod by the fixed disk, the guide is provided with a slideway for the sliding block to slide, the spring is arranged in the slideway, two ends of the spring are respectively connected with the fixed disc and the sliding block, the sliding block is located at an end of the slideway and located in a swing path of an end of the swing rod.

As a further improvement of the above-described solution, the energy conversion assembly also comprises a yoke and a plurality of magnets, the yoke is fixed inside the box body, the magnetostrictiverod is disposed inside the yoke with one end extending out of the yoke, and the magnets are disposed inside the yoke and distributed on two sides of the magnetostrictiverod.

As a further improvement of the above-described solution, the magnetostrictiverod is made of one of Terfenol-D, Galfenol and Metglas.

Based on the above-described technical solution, the embodiment of the present invention has at least the following beneficial effects: in the above-described technical solution, the swing rod is hinged with the box body, one end of the swing rod extends into the box body, the other end of the swing rod is located outside the box body, a float is fixed at the other end of the swing rod, and the float can drive the swing rod to swing to a certain extent under the action of sea waves; with regards to the basic layer arranged inside the box body, several piezoelectric patches are arranged on the basic layer in the length direction, and the piezoelectric patches will generate a piezoelectric effect when being deformed and generate voltage; the energy transmission assembly fixed inside the box is located between the swing rod and the base layer, and both the swing rod and the base layer are connected with the energy transmission assembly; when working, the energy harvesting device of this solution is placed on the ocean or river, the float drives the swing rod to swing under the action of waves, and the swinging generated by the swing rod is converted into squeezing to the base layer by the energy transmission assembly, so that the base layer is elastically deformed, and thus the piezoelectric patches arranged on the base layer are driven to generate the piezoelectric effect to output voltage, and the wave energy is converted into electric energy effectively and maximally; in addition, the energy harvesting device of the present invention is simple in structure, easy to manufacture and low in cost and has a great economic effect.

BRIEF DESCRIPTION OF DRAWINGS

The present invention will be further explained with reference to the following drawings and embodiments.

DETAILED DESCRIPTION OF EMBODIMENTS

Figure 1:
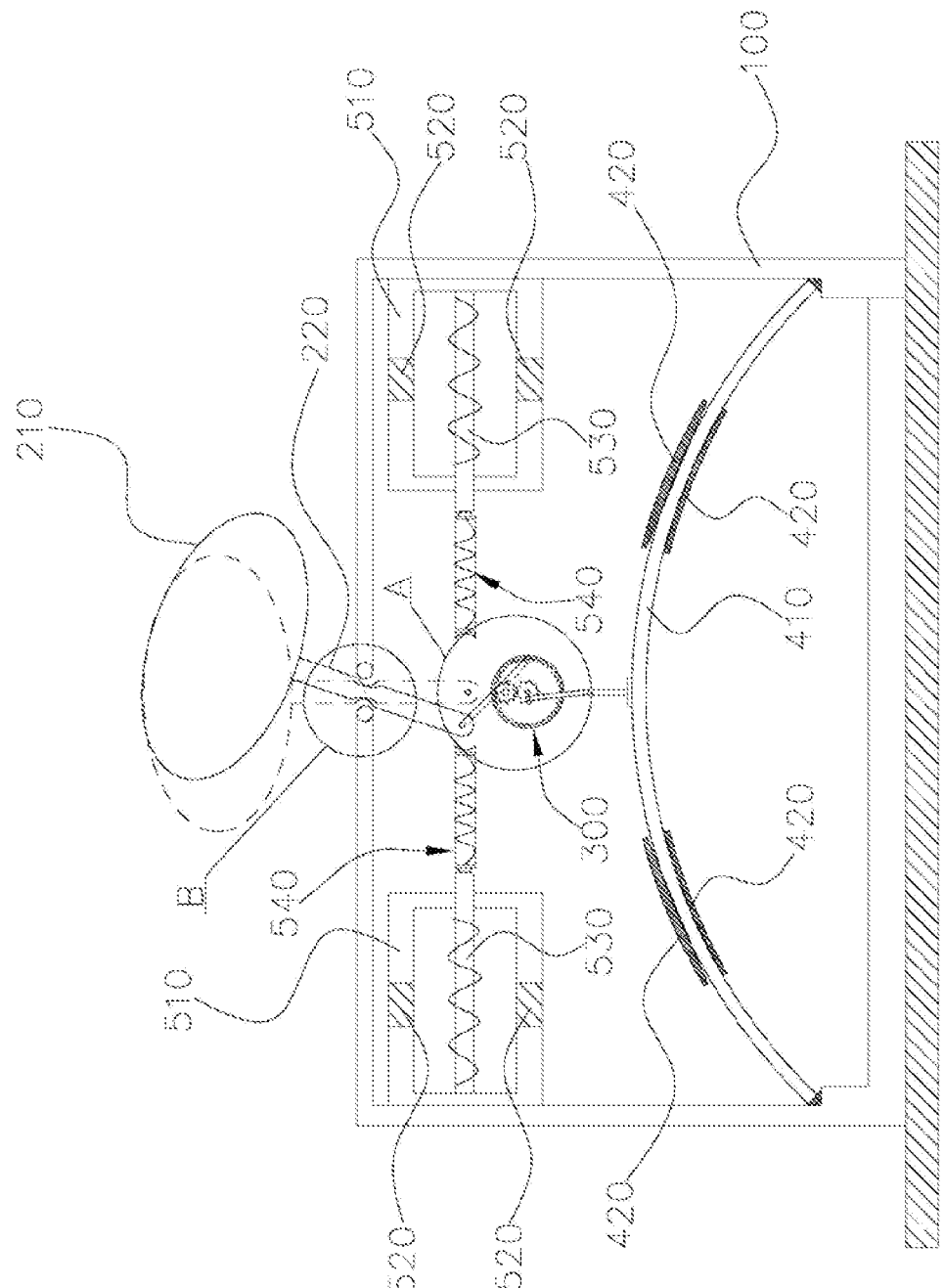
FIG. 1 is a schematic structural diagram of an embodiment of the present invention.

Reference will now be made in detail to the present embodiments of the present invention, preferred embodiments of which are illustrated in the accompanying drawings, the drawings are provided for supplementing the description of the written part of the specification with figures so that one can visually and vividly understand each technical feature and the whole technical solution of the present invention, but they should not be construed as limiting the scope of the invention.

In the description of the present invention, it should be understood that the orientation or positional relationship referred to in the description of the orientation, such as "upper", "lower", "front", "rear", "left", "right", etc., is based on the orientation or positional relationship shown in the drawings only for the convenience of description of the present invention and simplification of the description, and does not indicate or imply that a device or an element referred to must have a specific orientation, be constructed and operated in a specific orientation, and thus should not be construed as limiting the present invention.

In the description of the present invention, the meaning of "several" is one or more, the meaning of "a plurality of" is two or more, "greater than", "less than", "exceeding", etc. shall be understood in an exclusive sense, and "above", "below", "within", etc. shall be understood in an inclusive sense. If "first" and "second" are described, they are only for the purpose of distinguishing technical features, and cannot be understood as indicating or implying relative importance, or indicating the number of the indicated technical features or the order of the indicated technical features.

In the description of the present invention, unless otherwise specifically limited, words such as setting, installation, connection and the like should be understood in a broad sense, and those skilled in the art can reasonably determine the specific meanings of the above words in the present invention by combining the specific contents of the technical solutions.

Figure 2:
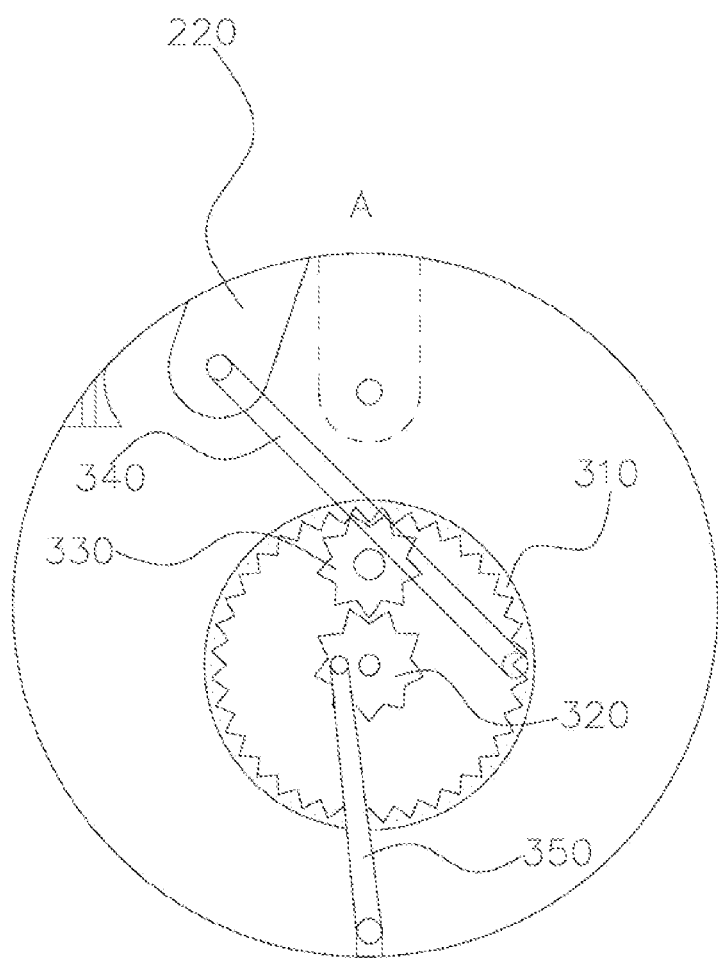
FIG. 2 is an enlarged schematic diagram at A in FIG. 1.

Referring to FIGS. 1 to 2, the energy harvesting device based on wave energy in the embodiment of the present invention comprises a box body 100, a swing rod 220, a base layer 410 and an energy transmission assembly.

Figure 5:
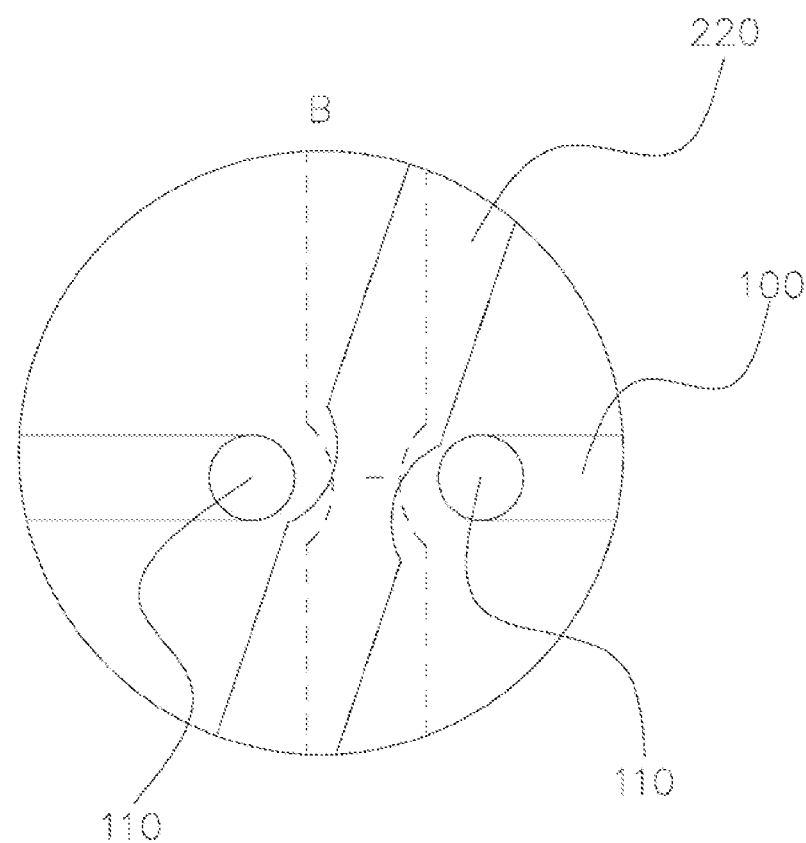
FIG. 5 is an enlarged schematic diagram at B in FIG. 1.

As for the swing rod 220, the swing rod 220 is hinged with the box body 100, wherein one end of the first transmission lever 220 extends into the inside of the box body 100, and a float 210 is disposed at the other end of the first transmission lever 220. Specifically, as shown in FIG. 5, a slot for the swing rod 220 to extend into is formed in one side of the box body 100, and rotatable rollers 110 are arranged on two sides of the slot. Correspondingly, the swing rod 220 is provided with grooves matched with the rollers 100, so that the swing rod 220 and the box body 100 form a hinge structure and the swing rod 220 can swing with a certain amplitude.

As for the base layer 410, the base layer 410 is arranged inside the box body 100, and the base layer 410 is provided with a plurality of piezoelectric patches 420 in a length direction. Specifically, the middle of the base layer 410 bulges to form an arc-shaped structure, the piezoelectric patches 420 are distributed inside and outside of the arc-shaped structure, and several piezoelectric patches 420 are sequentially connected in series. If the piezoelectric patches 420 here are deformed, they may generate a piezoelectric effect to output voltage, while the base layer 410 under the action of the outside and inside can be elastically deformed.

As for the energy transmission assembly 300, the energy transmission assembly 300 is fixed inside the box body 100 and located between the swing rod 220 and the base layer 410, one side of the energy transmission assembly 300 is connected with one end of the swing rod 220 extending into the box body 100, and the other side of the energy transmission assembly 300 is in transmission connection with the base layer 410. When working, the assembled energy harvesting device is placed on the sea or on a river, and the float 210 with an oval cross section can be semi-submerged on the river or sea surfaces to bear the impact of waves. Under the impact of the waves, the float 210 drives the swing rod 220 to swing periodically, and the swinging of the swing rod 220 is converted into the squeezing to the base layer 410 by the energy transmission assembly 300, so that the base layer 410 is elastically deformed, then the piezoelectric patches 420 arranged on the deformed surface of the base layer 410 is deformed due to elastic deformation of the base layer 410, and thus the piezoelectric patches 420 are driven to generate a piezoelectric effect to output voltage, thereby effectively and maximally converting the wave energy into electric energy.

As shown in FIG. 2, the energy transmission assembly 300 comprises a first connecting rod 340, a second connecting rod 350, a first gear 310 and a second gear 320, wherein the first gear 310 is rotatably connected with the box body 100, the second gear 320 is rotatably connected with the box body 100 and is in transmission connection with the first gear 310, one end of the first connecting rod 340 is hinged with the swing rod 220, the other end of the first connecting rod 340 is hinged with the first gear 310, and specifically a hinge point between the first connecting rod 340 and the first gear 310 is not located in the rotation center of the first gear 310, so that when the swing rod 220 drives the first connecting rod 340 to move, the first gear 310 rotates periodically. As for the second connecting rod 350, one end of the second connecting rod 350 is hinged with the second gear 320, and the other end of the second connecting rod 350 is hinged with the base layer 410. Since a hinge point between the second connecting rod 350 and the second gear 320 is not located at the rotation center of the second gear 320, when the first gear 310 drives the second gear 320 to rotate periodically, an end of the second connecting rod 350 hinged with the second gear 320 can rotate around the rotation center of the second gear 320, thereby driving the other end of the second connecting rod 350 to squeeze the base layer 410 in a reciprocating manner, to allow the base layer 410 to generate periodic elastic deformation, and further to drive the piezoelectric patches 420 to generate a piezoelectric effect.

Furthermore, the first gear 310 is in transmission connection with the second gear 320 through a third gear 330, and the number of teeth of the second gear 320 and the number of teeth of the third gear 330 are both less than the number of teeth of the first gear 310. Even when the waves are small, the swing amplitude of the swing rod 220 is small, and the periodic rotation amplitude of the first gear 310 is small. However, since the number of teeth of the second gear 320 and the number of teeth of the third gear 330 are both less than the number of teeth of the first gear 310, in this case the second gear 320 can also be driven to rotate at a certain rate, and the base layer 410 can be elastically deformed at a certain frequency.

Further, the first gear 310 is an internal gear, the second gear 320 and the third gear 330 are both external gears, and the second gear 320 is located in the center of the first gear 310, wherein both the first gear 310 and the second gear 320 are meshed with the third gear 330, thus forming a planetary gear mechanism; the first gear 310 rotates under the transmission of the swing rod 220 through the first connecting rod 340, then the third gear 330, which is a planetary gear, is driven to rotate, the second gear 320 is driven to rotate while the third gear 330 rotates, and a central shaft of the third gear 330 rotates around the second gear 320, so that one end of the second connecting rod 350 hinged with the second gear 320 moves circularly around the rotation center of the second gear 320, and the other end of the second connecting rod 350 is driven to make reciprocating lifting motion.

Preferably, the gear ratio of the first gear 310, the second gear 320 and the third gear 330 is one of 2:1:1, 3:1:1 and 4:1:2. In this example, it is assumed that the first gear 310 has 36 teeth, and the second gear 320 and the third gear 330 both have 9 teeth; when one end, located at the box body 100, of the swing rod 220 swings from the highest point at the left end or at the right end to the lowest point, the first connecting rod 340 drives the first gear 310 to rotate 9 teeth, and then the second gear 320 and the third gear 330 also rotate 9 teeth, that is, the second gear 320 and the third gear 330 rotate one cycle; under the action of the second connecting rod 350, the highest point of the base layer 410 undergoes a sinusoidal load of one cycle, which makes the piezoelectric patches 420 deform periodically, so that current is generated regularly, and rectification and storage of electric energy or use are facilitated.

In addition, the energy harvesting device based on wave energy also comprises an energy conversion assembly and a spring assembly 540 that are arranged inside the box body 100, the energy conversion assembly comprises a magnetostrictiverod 530 in a magnetized state and a closing coil 550, the closing coil 550 is sleeved on the magnetostrictiverod 530, the spring assembly 540 is fixed at an end of the magnetostrictiverod 530, and mechanical energy of the swing rod 220 is converted into pressure on the magnetostrictiverod 530 through the spring assembly 540, so that the magnetostrictiverod 530 generates a magnetostrictive effect; and the magnetostrictiverod 530 generates mechanical deformation to result in the change of the magnetized state, which in turn causes the magnetic flux in the closing coil 550 to change, so that the closing coil 550 generates induced current. As shown in FIG. 1, there are two energy conversion assemblies in total, respectively distributed at two ends of the swing path of the swing rod 220, and correspondingly, there are two spring assemblies 540.

Figure 4:
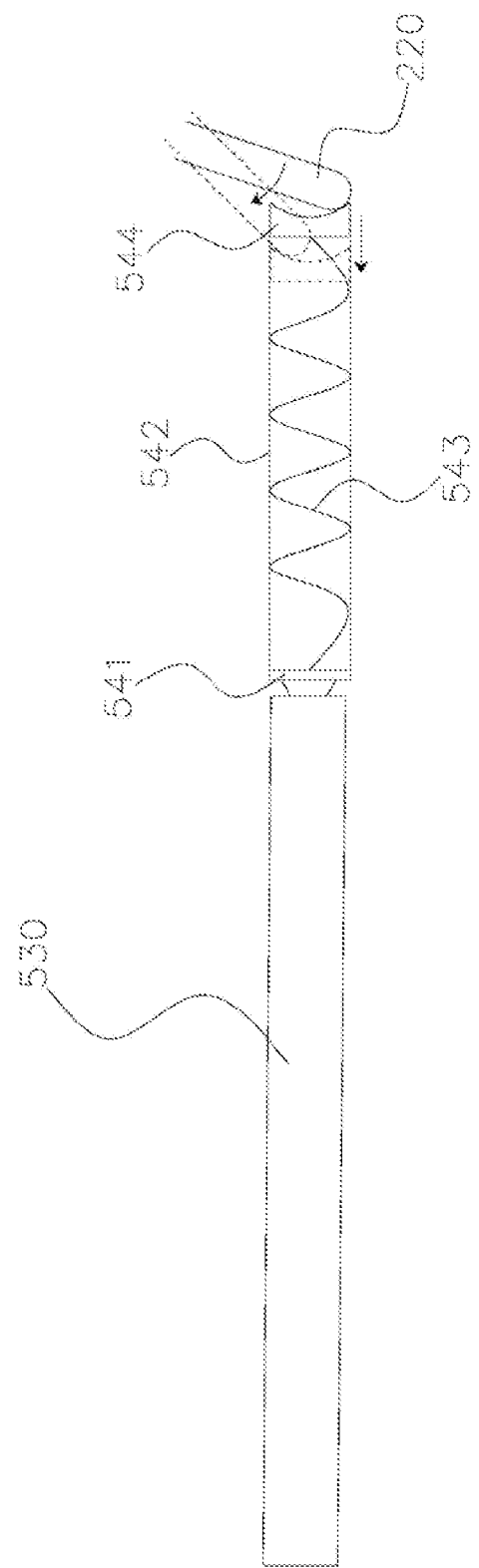
FIG. 4 is a schematic structural diagram of a spring assembly in an embodiment of the present invention.

Specifically, as shown in FIG. 4, the spring assembly 540 comprises a fixed disk 541, a guide 542, a spring 543 and a sliding block 544, the guide 542 is fixed at an end of the magnetostrictiverod 530 by the fixed disk 541, the guide 542 is provided with a slideway for the sliding block 544 to slide, the spring 543 is arranged in the slideway, two ends of the spring 543 are respectively connected with the fixed disc 541 and the sliding block 544, and the sliding block 544 is located at an end of the slideway and located in a swing path of an end of the swing rod 220. It should be noted that a position of the sliding block 544 in this embodiment is at three-quarters of the highest swing height of the end of the swing rod 220; when the end of the swing rod 220 swings to the highest position, the sliding block 544 will move toward the fixed disk 541, and the spring 543 will store energy; after the spring 543 stores energy, the energy will be transmitted to the end of the magnetostrictiverod 530 through the fixed disk 541 and the magnetostrictiverod 530 will be mechanically deformed; at the same time, the magnetostrictiverod 530 will drive the sliding block 544 to reset under its own reset action, and then the sliding block 544 will apply a force to the end of the swing rod 220, which will help the end of the swing rod 220 swing toward the lowest point, so that a swing response of the swing rod 220 is strengthened, and the wave energy harvesting effect is effectively improved.

Figure 3:
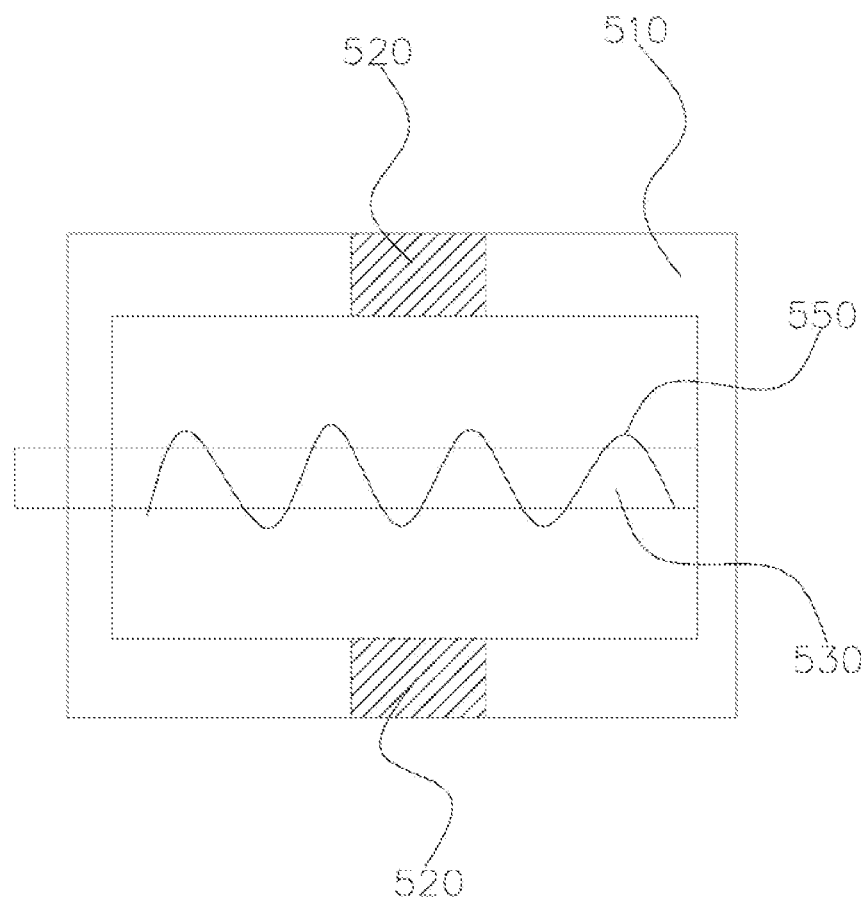
FIG. 3 is a schematic structural diagram of an energy conversion assembly in an embodiment of the present invention.

As shown in FIG. 3, the energy conversion assembly also comprises a yoke 510 and a plurality of magnets 520; the yoke 510 is fixed inside the box body 100; the magnetostrictiverod 530 is arranged inside the yoke 510 with one end extending out of the yoke 510; the magnets 520 are disposed inside the yoke 510 and distributed on both sides of the magnetostrictiverod 530; the magnets 520 here are preferably permanent magnets; and the yoke 510 is used to enhance the attraction force between the closing coil 550 and the magnetostrictiverod 530 and to enclose magnetic force lines generated by the closing coil 550 inside, thereby improving the induction efficiency. Preferably, the magnetostrictiverod 530 is made of one of Terfenol-D, Galfenol and Metglas.

To sum up, it can be seen that the working principle of the present invention is as follows: the float 210 swings under the impact of sea waves, wave energy is converted into mechanical energy by the energy transmission assembly 300 in cooperation with the swing rod 220, the mechanical energy acts on the base layer 410, and the mechanical energy acts on the magnetostrictiverod 530 through the spring assembly 540, so that the piezoelectric patches 420 on the base layer 410 are mechanically deformed, causing the change of electric charge to generate electric current; and the spring assembly 540 acts on the magnetostrictiverod 530 after energy storage through deformation generation, mechanical deformation of the magnetostrictiverod 530 causes its own magnetic induction strength to change, so that the magnetic flux of the closing coil 550 sleeved on the magnetostrictiverod 530 changes, thereby generating induced current. It should be noted that the spring assembly 540 not only plays a role in transmitting mechanical energy, but also plays a role in strengthening a swing response of the swing rod 220, and current generated by the piezoelectric patches 420 and the closing coil 550 are collected and stored by a collecting circuit, so that the utilization efficiency of wave energy is effectively improved.

The embodiments of the present invention have been described in detail with reference to the drawings, but the present invention is not limited to the embodiments, and various changes can be made within the knowledge of those skilled in the art without departing from the gist of the present invention.

The invention claimed is:

1. An energy harvesting device based on wave energy comprising:
   a box body (100);
   a swing rod (220) hinged with the box body (100), wherein one end of the swing rod (220) extends into the box body (100) and a float (210) is fixed to the other end of the swing rod (220);

a base layer (410) arranged inside the box body (100) and provided with a plurality of piezoelectric patches (420) in a length direction; and an energy transmission assembly (300) fixed inside the box body (100) and located between the swing rod (220) and the base layer (410), one side of the energy transmission assembly (300) is connected with one end of the swing rod (220) extending into the box body (100), the other side of the energy transmission assembly (300) is in transmission connection with the base layer (410), wherein the energy transmission assembly (300) converts the swinging of the swing rod (220) into squeezing to the base layer (410), so that the base layer (410) is elastically deformed, and thus the piezoelectric patches (420) are driven to generate a piezoelectric effect to output voltage.

2. The energy harvesting device based on wave energy according to claim 1, wherein the energy transmission assembly (300) comprises a first connecting rod (340), a second connecting rod (350), a first gear (310) and a second gear (320), the first gear (310) is rotatably connected with the box body (100), the second gear (320) is rotatably connected with the box body (100) and is in transmission connection with the first gear (310), one end of the first connecting rod (340) is hinged with the swing rod (220), the other end of the first connecting rod (340) is hinged with the first gear (310), one end of the second connecting rod (350) is hinged with the second gear (320), and the other end of the second connecting rod (350) is hinged with the base layer (410).

3. The energy harvesting device based on wave energy according to claim 2, wherein the first gear (310) is in transmission connection with the second gear (320) through a third gear (330), and the number of teeth of the second gear (320) and the number of teeth of the third gear (330) are both less than the number of teeth of the first gear (310).

4. The energy harvesting device based on wave energy according to claim 3, wherein the first gear (310) is an internal gear, the second gear (320) and the third gear (330) are both external gears, the second gear (320) is located in the center of the first gear (310), wherein the first gear (310) and the second gear (320) are both meshed with the third gear (330), thereby forming a planetary gear mechanism.

5. The energy harvesting device based on wave energy according to claim 4, wherein the gear ratio of the first gear (310), the second gear (320) and the third gear (330) is one of 2:1:1, 3:1:1 and 4:1:2.

6. The energy harvesting device based on wave energy claim 1, wherein the middle of the base layer (410) bulges to form an arc-shaped structure, the piezoelectric patches (420) are distributed inside and outside the arc-shaped structure, and several piezoelectric patches (420) are sequentially connected in series.

7. The energy harvesting device according to claim 1, wherein the energy harvesting device based on wave energy also comprises an energy conversion assembly and a spring assembly (540) that are arranged inside the box body (100), the energy conversion assembly comprises a magnetostrictiverod (530) in a magnetized state and a closing coil (550), the closing coil (550) is sleeved on the magnetostrictiverod (530), the spring assembly (540) is fixed at an end of the magnetostrictiverod (530), and mechanical energy of the swing rod (220) is converted into pressure on the magnetostrictiverod (530) through the spring assembly (540).

8. The energy harvesting device based on wave energy according to claim 7, wherein the spring assembly (540) comprises a fixed disk (541), a guide (542), a spring (543) and a sliding block (544), the guide (542) is fixed at an end of the magnetostrictiverod (530) by the fixed disk (541), the guide (542) is provided with a slideway for the sliding block (544) to slide, the spring (543) is arranged in the slideway, two ends of the spring (543) are respectively connected with the fixed disc (541) and the sliding block (544), the sliding block (544) is located at an end of the slideway and located in a swing path of an end of the swing rod (220).

9. The energy harvesting device based on wave energy according to claim 7, wherein the energy conversion assembly also comprises a yoke (510) and a plurality of magnets (520), the yoke (510) is fixed inside the box body (100), the magnetostrictiverod (530) is disposed inside the yoke (510) with one end extending out of the yoke (510), and the magnets (520) are disposed inside the yoke (510) and distributed on two sides of the magnetostrictiverod (530).

10. The energy harvesting device based on wave energy according to claim 7, wherein the magnetostrictiverod (530) is made of one of Terfenol-D, Galfenol and Metglas.

* * * * *